United States Patent
Shivanna

(10) Patent No.: US 11,436,324 B2
(45) Date of Patent: Sep. 6, 2022

(54) MONITORING PARAMETERS OF CONTROLLERS FOR UNAUTHORIZED MODIFICATION

(71) Applicant: HEWLETT PACKARD ENTERPRISE DEVELOPMENT LP, Houston, TX (US)

(72) Inventor: Suhas Shivanna, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 443 days.

(21) Appl. No.: 16/566,988

(22) Filed: Sep. 11, 2019

(65) Prior Publication Data

US 2020/0143047 A1 May 7, 2020

(30) Foreign Application Priority Data

Sep. 27, 2018 (IN) .............................. 201841036593

(51) Int. Cl.
*G06F 21/55* (2013.01)
*H04L 9/08* (2006.01)
*G06F 21/57* (2013.01)

(52) U.S. Cl.
CPC .......... *G06F 21/554* (2013.01); *G06F 21/572* (2013.01); *H04L 9/0891* (2013.01); *G06F 2221/033* (2013.01)

(58) Field of Classification Search
CPC .............................. G06F 21/554; G06F 21/572
See application file for complete search history.

(56) References Cited

U.S. PATENT DOCUMENTS

| | | | |
|---|---|---|---|
| 5,426,421 A * | 6/1995 | Gray | H04M 11/007 340/3.32 |
| 7,715,930 B2 | 5/2010 | Bush et al. | |
| 7,975,286 B1 * | 7/2011 | Fickey | H04L 63/20 726/1 |
| 8,683,546 B2 | 3/2014 | Dunagan et al. | |
| 9,317,690 B2 | 4/2016 | Sallam | |
| 9,817,975 B2 | 11/2017 | Liu et al. | |
| 2002/0002607 A1 * | 1/2002 | Ludovici | H04L 41/22 709/223 |

(Continued)

FOREIGN PATENT DOCUMENTS

WO WO-2017131622 A1 8/2017

OTHER PUBLICATIONS

HP Development Company, L.P., "HP Sure Start Automatic Firmware Intrusion Detection and Repair," Technical White Paper, Feb. 2018, pp. 1-14.

*Primary Examiner* — William S Powers
(74) *Attorney, Agent, or Firm* — Hewlett Packard Enterprise Patent Department

(57) ABSTRACT

Examples disclosed herein relate to approaches for securing a computing system. A management controller is to monitor a plurality of parameters of monitored controllers. The management controller provides each of the controllers a key to update the parameters. The management controller includes a representation of the parameters. A current version of one of the parameters is received from one of the monitored controllers. It is determined whether an unauthorized modification occurred to the current version of the first parameter using the representation.

20 Claims, 4 Drawing Sheets

(56) References Cited

U.S. PATENT DOCUMENTS

| | | | | |
|---|---|---|---|---|
| 2002/0095591 A1* | 7/2002 | Daniell | ............... | G06F 21/55 |
| | | | | 726/26 |
| 2004/0128551 A1* | 7/2004 | Walker | ............... | G06F 21/6218 |
| | | | | 726/19 |
| 2005/0265343 A1* | 12/2005 | Kito | ............... | H04L 63/02 |
| | | | | 370/392 |
| 2006/0244742 A1* | 11/2006 | Nakamura | ............... | G06F 21/31 |
| | | | | 345/204 |
| 2007/0179904 A1* | 8/2007 | Hofstee | ............... | G06Q 20/3674 |
| | | | | 705/67 |
| 2007/0271472 A1* | 11/2007 | Grynberg | ............... | G06F 3/0679 |
| | | | | 713/193 |
| 2008/0155509 A1* | 6/2008 | Ohta | ............... | G06F 21/572 |
| | | | | 717/127 |
| 2008/0274696 A1* | 11/2008 | Bakshi | ............... | H04M 1/6066 |
| | | | | 455/41.2 |
| 2009/0205031 A1* | 8/2009 | Sato | ............... | A63F 13/71 |
| | | | | 726/7 |
| 2016/0283715 A1* | 9/2016 | Duke | ............... | G06Q 20/308 |
| 2017/0223230 A1 | 8/2017 | Bunker et al. | | |
| 2018/0217828 A1* | 8/2018 | Madrid | ............... | H04L 63/0428 |

\* cited by examiner

MONITORING PARAMETERS OF CONTROLLERS FOR UNAUTHORIZED MODIFICATION

BACKGROUND

Service providers and manufacturers are challenged to deliver quality and value to consumers, for example by providing access to computing capabilities. A data center is a facility used to house computer networks, computer systems, and associated components, such as telecommunications and storage systems. Datacenters, offices, etc. can be end locations for computing devices manufactured by a manufacturer. Computing devices may be attacked and thus it can be beneficial to include security features in computing devices.

BRIEF DESCRIPTION OF THE DRAWINGS

The following detailed description references the drawings, wherein.

Figure 1:
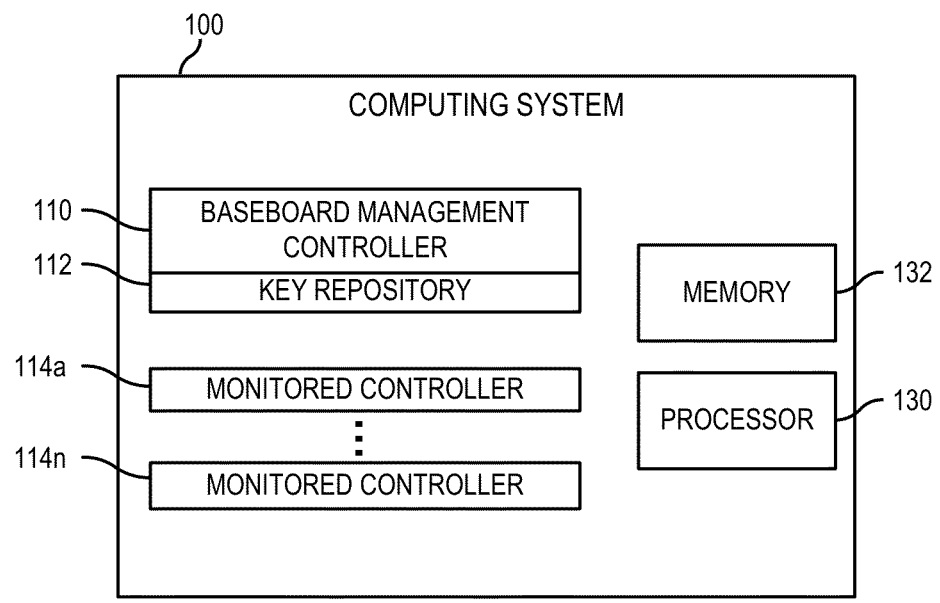
FIGS. 1 and 2 are block diagrams of computing systems capable of monitoring for unauthorized modification of parameters, according to various examples.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

DETAILED DESCRIPTION

Computing devices such as servers have been attacked for malicious purposes. As security attacks become more prominent at lower layers, advanced security features can be used to secure computing devices. Nation state sponsored security research and cheap availability of computer hacking tools ranging from rootkits to exploits from dark web has resulted in increased exposure to attacks at lower level layers that is designed to weaken the security and pave the way for advanced attacks using sophisticated combination of malwares. With the increase exposure to advanced persistent threats (APT) and root kits targeting firmware/hardware, advanced security solutions that can detect the presence of sophisticated malwares targeted at weakening and compromising the security of data center devices can be beneficial.

Within a computing device there are multiple firmware components and multiple controllers (e.g. management processor such as a baseboard management controller (BMC), innovation engine (IE) and/or management engine (ME) controllers, Input/Output (IO) Cards, non-volatile memory (NVM) controllers, memory controllers, storage controllers, etc.) that can be accessed from either the management processor, Unified Extensible Firmware Interface (UEFI), or Operating System (OS) based software components. Each of these firmware components running in its own controller can have many security settings that are used for the operation of the computing device at the desired security posture/level.

For example, there are multiple security parameters that are present in platform firmware (e.g., UEFI, Basic Input/Output System (BIOS)), a BMC, and the system chipset that are used for the secure operation of the computing device. Some of these parameters include a secure boot setting, a password enable/disable status, System Management Mode (SMM) configuration registers, storage drive encryption mode, networking communication settings, etc. With multiple access points that includes direct physical access and/or via the operating system based one or multiple management interfaces, it can be beneficial to ensure that these configurations and registers are monitored and protected against accidental changes, insider attack, or attacks using advanced malwares targeting the hardware/firmware layer.

Accordingly, various examples described herein relate to detecting and recovering from attacks on security parameters using APT and firmware/OS root kits using a standardized and signed audit logging solution and a monitoring engine. These features can be implemented in a management subsystem (e.g., BMC) that is protected using a hardware root of trust. In some examples, the approach is a generic and scalable solution using a security audit log based check pointing methods along with efficient polling of controllers that are monitored inside of the computing device.

In various examples, an adaptive and centralized audit log monitoring engine running on a hardware root of trust (ROT) enabled management processor is used. The processor provides an interface for standardized and signed audit logs to be received from multiple management controllers within a computing device chassis (e.g., NVM Controllers, IE/ME management processors, IO controllers, etc.). To enable a scalable and standardized solution, signed and standardized audit log management can be used to enable automated check pointing on each monitored parameter (e.g., a critical security parameter) within a device.

Standardized and categorized audit logs can help identify the authorized operations carried on any specific management controller and can have unique identifiers for each of the possible operations within a hardware device along with optional payloads. In some examples, auxiliary management controllers on reboot can register handlers with the centralized monitoring engine using a unique structure identifier containing references to a set of security parameters. Associated audit log identifiers where the audit logs are generated on modification of the parameters can be stored in the structure using securely authenticated and authorized interfaces.

In one example, if IO controller 1 has security settings like Federal Information Processing Standards (FIPS) mode, password enable/disable settings that need to be monitored for drift, a structure including these security parameters can be added to structure template identified using a unique identifier and associated with an audit log that gets generated on modification of this structure through any management interface.

The structure containing the parameters and associated audit logs can help support adaptive polling of security critical configuration registers like processor and chipset registers. The structure can help identify authorized and unauthorized parameter modification.

In some examples, when a system is provisioned, a backup copy of each of the monitored parameters across the main and auxiliary management controllers can be stored in a secure storage within the device (e.g., a secure location on a BMC, a storage device used in conjunction with the BMC, etc.).

In some examples, a fingerprint that maps to a unique structure identifier including parameter configuration with the associated controller ID for a monitored controller is also stored in the secure storage. The monitoring engine can use configurable policies for periodic verification and associated actions. The monitoring engine can use a registered handler (e.g. a BIOS handler for BIOS parameter or other handlers implemented in other controllers such as an IO controller) to periodically read the structure including monitored parameters, for example, by using a Management Component Transport Protocol (MCTP) or other standard protocols. The monitoring engine can fingerprint the parameters to identify any unauthorized changes, e.g., changes to the monitored parameters performed without an associated audit log. This can be implemented by comparing the structure with the secure storage fingerprints.

This method and apparatus helps to detect modifications to the parameters that use side channel or Advanced Persistent Threats (APT) malware to compromise the security posture of the device. The approaches described can help protect modification of parameters such as critical security parameters or critical security registers of BIOS from OS/Kernel level vulnerabilities where the Kernel may allow an attacker to modify the settings directly bypassing any level of protection including authentication. Further, the approaches can be used to protect from modification of parameters of IO device registers using potential vulnerabilities in IO Drivers bypassing any level of protection including authentication. Moreover, the approaches described can help protect the system from modification of parameters such as critical security parameters or critical security registers or MSR using a vulnerability in one management controller that enable modification of another controller memory (e.g. using shared memory channels that may be present between 2 management controllers). Further, the system may protect from modification of parameters of controllers using vulnerabilities in the client software that is used to manage the devices (e.g. buffer overflow or carefully crafted strings).

Figure 2:
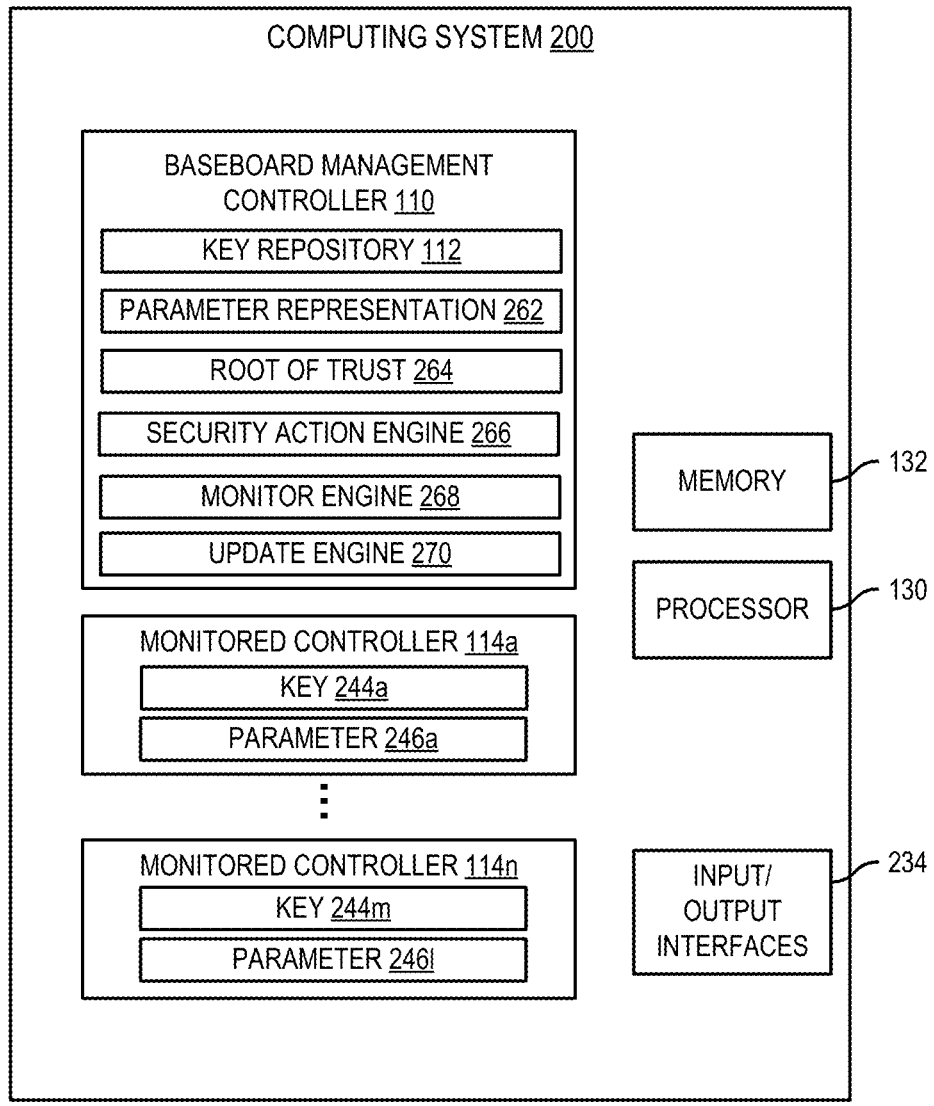

FIGS. 1 and 2 are block diagrams of computing systems capable of monitoring for unauthorized modification of parameters, according to various examples. Computing systems 100, 200 include components that can be used to monitor and protect parameters of controllers of computing system 100, 200. The respective computing systems may be a server, such as a rack server or blade server, notebook computer, a desktop computer, a tablet computing device, a wireless device, a workstation, or any other computing device that can implement the features described herein. Computing system 100 can include a baseboard management controller 110, a key repository, monitored controllers 114a-114n, at least one processor 130, and memory 132. Computing system 200 can further include input/output interfaces 234. Further, the BMC 110 can further include the key repository 112, a parameter representation 262, a root of trust 264, a security action engine 266, a monitor engine 268, and an update engine 270. The monitored controllers 114a-114n can further include respective keys 244a-244m provided by the BMC 110. Moreover the monitored controllers 114 can include the respective parameters 246a-246l that are protected using the mechanisms described herein.

As used herein, a parameter 246 is a setting associated with a respective monitored controller 114. A monitored parameter 246 is a parameter that is being monitored by a monitor engine 268 using the techniques described herein. Moreover, a security parameter is a parameter 246 that relates to protecting the computing system 200. Examples of parameters 246 include registers of the respective monitored controllers 114, for example, chipset registers, control and status registers (CSRs), model status registers (MSR) of a processor, security configuration information associated with IO cards in pre-boot and/or OS environments, etc.

In some examples, the platform firmware can be monitored. In this example, the BMC 110 may have access to memory associated with the platform firmware where the parameter is stored and can retrieve information from the platform firmware. In some examples, a processing element such as processor 130 can provide communications associated with the platform firmware to the BMC 110 (e.g., audit logs, message transfer mechanisms, etc.).

As used herein, a monitored controller 114 is a chip or set of chips and communications links within the computing system 200 that is monitored by a monitor engine 268. Further, as used herein, for the monitor engine 268 to monitor the monitored controller 114, the monitored controller 114 provides at least one current parameter 246 to the monitor engine 268 via a communication path. The communication can be signed as described below.

In one example, the BMC 110 may be associated with a secure storage, a hardware root of trust 264, or other security features. In one example, on initial boot of the computing system 200 into a service operating system (OS) or provisioning engine in a factory, a unique private and public key are generated and 'glued' onto the system by being saved into the BMC storage. This storage can be persistent and not replaceable. The BMC 110 may allow indirect access to a key using an application programming interface. The values can be written to a write once register on a same Application Specific Integrated Circuit (ASIC) as the BMC 110. The write once register can be implemented, for example, using fuses. In one example, the private key is created by executing an algorithm using random sources and is programmed. In another example, the public key is a cryptographic hash of the private key. In some examples, once programmed, the ability to change the registers is disabled (e.g., severing a fuseable link, for example, on a write line). In some examples, the BMC 110 can be used to ensure that firmware of the computing system 200 is secure (e.g., by ensuring that firmware is not updated unless it is signed or encrypted using a public key that the private key of the BMC 110 can decrypt. Further, in some examples, the BMC 110 can stop the computing system 200 from booting with compromised firmware.

Moreover, in some examples, the BMC 110 can further include a key repository 112. As used herein, a key repository 112 is a storage that includes at least one private key that can be used to verify that information has been signed by a public key. In some examples, the public key can also be included in the key repository 112. In some examples, a private key that is part of a root of trust 264 can be considered a part of a key repository 112.

In some examples, the BMC 110 can provide one of the keys in the key repository 112 to each of the monitored controllers 114a-114n. In some examples a same key can be used. In other examples, each monitored controller can be provided a different key generated using strong random generators and key derivation mechanisms. In some examples, the BMC 110 can use one or multiple search approaches to find monitored controllers 114 to provide the keys to. In other examples, when a monitored controller 114 (e.g., a peripheral connect interface express (PCIe) card controller) is added, the monitored controller 114 can indicate to the BMC 110 that it is present and the BMC 114 can provide a key. In some examples, the BMC 110 at a manufacturing or initial bring up phase of the computing system 200 can provide keys to initially present controllers. In some examples, the BMC 110 can include vectors to find compatible controllers via various interfaces that connect the BMC 110 to monitored controllers. In some examples, the interfaces can include one or multiple chips busses that communications between the monitored controllers and the BMC 110 can travel through. Respective keys 244a-244m can be stored in a secure storage of each monitored controller 114a-114n.

The BMC 110 can interrogate the monitored controller 114a-114n to request information about parameters 246. In some examples, each monitored controller 114 can be associated with a controller type identifier. The BMC 110 can include a list of parameters to monitor for each controller of a particular controller type. For example, a storage controller may have different parameters to monitor than a chipset IO controller. The monitored controllers 114 can include an API that is capable to identify monitored parameters 246 and provide the respective monitored parameters 246 to the BMC 110. This communication can be signed using the respective key 244. Initially, the first time a monitored controller 114 is found by the BMC 110, it can register itself, receive a key, and provide monitored parameters to the BMC 110.

The BMC 110 can create a parameter representation 262 based on the parameters received from monitored controllers. In some examples, a unique identifier (e.g., a serial number) for each monitored controller can also be kept. In some examples, the parameter representation 262 is kept in clear text. In other examples, the parameter representation 262 can be stored in the form of a hash (e.g., MD5 or SHA). In some examples, the parameter representation 262 can be stored in clear text, but cryptographic information for the representation is stored in a secure location to ensure that the parameter representation 262 is not modified.

Each monitored controller 114 can be configured such that when a parameter 246 is modified using an authorized approach (e.g., via a user interface provided to an OS, BIOS, BMC, etc.), the monitored controller 114 sends an update message to the update engine 270. The update message can be signed using the key 244. In some examples, the update message can be in the form of an audit log. The BMC 110 can receive, at the update engine 270, the updated version of the parameter for the monitored controller. As noted, the updated version can be signed by the key associated with the respective monitor. In response, the BMC's update engine 270 can verify the updated version using a private key. The update engine 270 can then update the representation to include the updated version of the parameter in response to successful verification. In some examples, more than one parameter can be changed at the same time. In these examples a single data structure can be used to convey, from the monitored controller to the update engine 270 all of the parameters associated with the particular monitored controller. Because the key is conveyed by the BMC 110 to the monitored controller 114 when the monitored controller 114 is first detected in the computing system 200 and initial parameter information and updates to parameters are conveyed via a signed message using the key, changes to any of the monitored parameters outside the normal access mechanisms can be considered an unauthorized modification. In some examples, a backup of each parameter can be kept by the BMC 110 in a backup store. Further, in some examples, an audit log can be kept by the monitored controller 114 including authorized modifications. The audit log can include, for example, the parameter(s) modified, the approach used for modification, information about an authorized user, and what the new value for the parameter(s) is.

The BMC 110 can use a monitor engine 268 to monitor the monitored controllers 114. In one example, the monitor engine 268 can interrogate each monitored controller 114 for a current version of respective parameter(s) 246. In turn, the respective monitored controller 114 can provide its respective parameter(s) to the BMC 110 in response to a request. As noted, the communication can be signed or encrypted. The monitor engine 268 can determine whether the received current version has an unauthorized modification. In one example, the monitor engine 268 can compare the current version of a parameter to the parameter representation 262 to determine whether it has changed compared to the expected value. If there is a deviation, an unauthorized modification has occurred. As noted above, the deviation can represent a potential attack on the computing system 200. In some examples, the interrogation can be part of a regular communication between the BMC 110 and monitored controller. In other examples, the monitored controller can be configured to regularly communicate its parameters 246.

The security action engine 266 can perform a security action in response to detection of an unauthorized modification. In one example, the security action can include sending an alert (e.g., a log message, an email, etc.) to an administrator, a security information and event management system, etc. In another example, the security action can include restoring the parameter to the expected value from the backup store. Further, in some examples, the security action engine 266 can verify firmware images and/or security configurations of the computing system 200. For example, the security action engine 266 can verify a platform firmware image, the BMC firmware image, the firmware images of the monitored controllers, etc., for example, using a secure boot process. Similarly, security configurations can be verified using a similar approach. These verifications can be performed prior to performing the restore of the backup version of the parameter or after.

Another mode of recovery could involve a centralized management station running security diagnostics on the monitored controller that had the drift in configuration without an associated audit log and then restore the configuration setting based on results from security diagnostics.

In another example, the system could be put in lockdown mode whereby if any parameters of any controller is changed using any of the interfaces, the centralized management station can immediately restore the configuration from a backup store. This solution can help in simplifying the overall monitoring the parameters across multiple auxiliary controllers with different capabilities and allow policy application from a centralized place (e.g. lockdown mode) while giving flexibility of managing multiple auxiliary controllers from different interfaces.

The BMC 110, monitored controller 114, and engines 266, 268, 270 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 130, such as a central processing unit (CPU) or a microprocessor suitable for retrieval and execution of instructions and/or electronic circuits can be configured to perform various functionality of the computing system 200. In certain scenarios, instructions and/or other information can be included in memory 132 or other memory. Input/output interfaces 234 may additionally be provided by the computing system 200. For example, input devices, such as a keyboard, a sensor, a touch interface, a mouse, a microphone, etc. can be utilized to receive input from an environment surrounding the computing system 200. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces 234.

In some examples, a silicon root of trust 264 feature supported by the computing system 200 is used to ensure that the firmware on the computing system 200 is not compromised. The silicon root of trust 264 ensures that the BIOS and BMC Firmware cannot be replaced with non-authentic BIOS and BMC Firmware even with physical access to the system.

A communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network can be in the form of a direct network link between devices. Various communications structures and infrastructure can be utilized to implement the communication network(s). Computing devices can connect to other devices using the communication network.

By way of example, devices communicate with each other and other components with access to the communication network via a communication protocol or multiple protocols. A protocol can be a set of rules that defines how nodes of the communication network interact with other nodes. Further, communications between network nodes can be implemented by exchanging discrete packets of data or sending messages. Packets can include header information associated with a protocol (e.g., information on the location of the network node(s) to contact) as well as payload information.

In some examples, the BMC 110 can be used to implement services for the computing system 100, 200. BMC 110 can be implemented using a separate processor from the processor 130 that is used to execute a high level operating system. BMCs can provide so-called "lights-out" functionality for computing devices. The lights out functionality may allow a user, such as a systems administrator, to perform management operations on the computing system 200 even if an operating system is not installed or not functional on the computing device. Moreover, in one example, the BMC 110 can run on auxiliary power, thus the computing system 200 need not be powered on to an on state where control of the computing system 200 is handed over to an operating system after boot. As examples, the BMC 110 may provide so-called "out-of-band" services, such as remote console access, remote reboot and power management functionality, monitoring health of the system, access to system logs, and the like.

As noted, in some instances, the BMC 110 may enable lights-out management of the computing system 200, which provides remote management access (e.g., system console access) regardless of whether the computing system 200 is powered on, whether a primary network subsystem hardware is functioning, or whether an OS is operating or even installed. The BMC 110 may comprise an interface, such as a network interface, and/or serial interface that an administrator can use to remotely communicate with the BMC 110. As used herein, an "out-of-band" service is a service provided by the BMC 110 via a dedicated management channel (e.g., the network interface or serial interface) and is available whether the computing system 200 is in powered on state.

In some examples, a BMC 110 may be included as part of an enclosure. In other examples, a BMC 110 may be included in one or more of the servers (e.g., as part of the management subsystem of the server) or connected via an interface (e.g., a peripheral interface). In some examples, sensors associated with the BMC 110 can measure internal physical variables such as humidity, temperature, power supply voltage, communications parameters, fan speeds, operating system functions, or the like. The BMC 110 may also be capable to reboot or power cycle the device. As noted, the BMC 110 allows for remote management of the device, as such, notifications can be made to a centralized station using the BMC 110 and passwords or other user entry can be implemented via the BMC 110.

The Operating System is a system software that manages computer hardware and software resources and provides common services for computer programs. The OS can be executable on processor 130 and loaded to memory 132. The OS is a high level OS such as LINUX, WINDOWS, UNIX, a bare metal hypervisor, or other similar high level software that a boot firmware engine of the computing system 200 turns control of the computing system 200 to.

Examples of devices or components that can include monitored controllers includes devices on a system board, and/or multiple components of the system board, bus devices on one or multiple bus (e.g., a PCIe bus), a controller hub and/or devices connected to the controller hub, field replaceable unit enclosures that include a management controller, a northbridge device, other ASICs, etc. As used herein, the system board is the main printed circuit board used for a computing system and allows communication between many of the components of the computing system.

In some examples, a controller hub can be an I/O controller hub, for example a southbridge. The controller hub may be used to manage data communications between a CPU and other components of the system board. In some examples, a controller hub may have direct media interface to a northbridge device or the CPU. Further the controller hub may provide peripheral support for the computing system 200, such as bus connections like Universal Serial Bus (USB), Peripheral Component Interconnect (PCI), PCI express, PCI extended, serial AT attachment, audio circuitry, integrated Ethernet, enhanced host controller interfaces, combinations thereof, etc. Other examples of identifiers that can be used include system board revision identifiers, complex programmable logic device revision identifiers, ASIC stepping identifiers, platform and chassis identifiers, riser identifiers, embedded controller identifiers, battery and power identifiers, storage component identifiers, etc.

Figure 3:
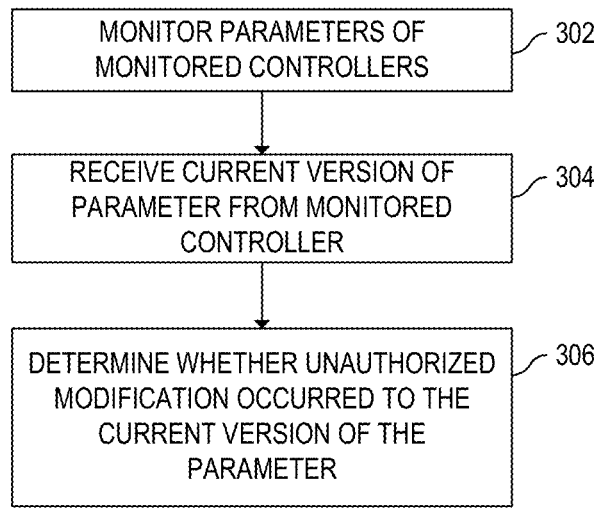
FIG. 3 is a flowchart of a method for determining whether unauthorized modification of a parameter has occurred, according to an example.
Figure 4:
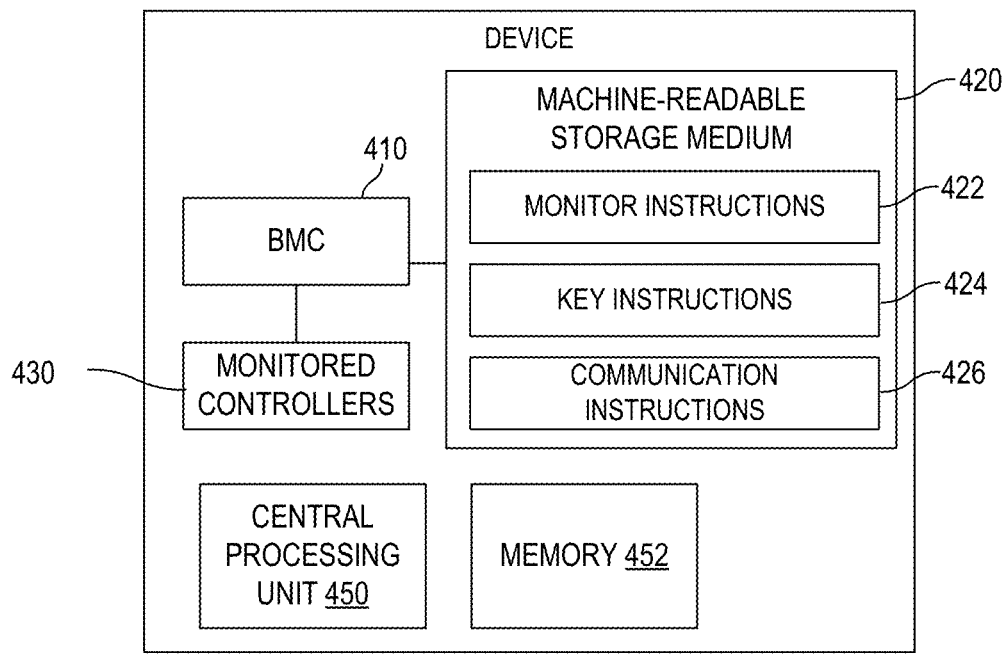
FIG. 4 is a block diagram of a device including a baseboard management controller capable to determine unauthorized modification of parameters of monitored controllers, according to an example.

FIG. 3 is a flowchart of a method for determining whether unauthorized modification of a parameter has occurred, according to an example. FIG. 4 is a block diagram of a device including a baseboard management controller capable to determine unauthorized modification of parameters of monitored controllers, according to an example.

BMC 410 can include a processing element, which can include hardware suitable for retrieval and execution of instructions stored in machine-readable storage medium 420. BMC 410 may fetch, decode, and execute instructions, such as monitor instructions 422, key instructions 424, and communication instructions. As an alternative or in addition to retrieving and executing instructions, BMC 410 include at least one integrated circuit (IC), other control logic, other electronic circuits, or combinations thereof that include a number of electronic components for performing the functionality of instructions 422, 424, 426.

Further, in some examples the device 400 can include a separate processing element, for example, one or multiple central processing unit (CPU) 450, one or multiple semiconductor-based microprocessor, one or multiple graphics processing unit (GPU), other hardware devices suitable for retrieval and execution of instructions stored in machine-readable storage medium such as memory 452, or combinations thereof. The processing element can be a physical device. Moreover, in one example, the processing element may include multiple cores on a chip, include multiple cores across multiple chips, multiple cores across multiple devices, or combinations thereof. Processing element may fetch, decode, and execute instructions, such as OS instructions, application instructions, etc.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for performing methods 300, 500, 600.

As noted above, the BMC 410 can be used monitor one or more parameters at monitored controllers 430. Each of the monitored controllers can include at least one of the parameters. Further, as noted above, the BMC 410 can include a key repository and/or a root of trust. The BMC 410 can search through the device 400 via one or more protocols and/or buses and identify monitored controllers 430. This can be accomplished at a single time, for example, at a factory provisioning phase, or initial boot at a client site when the device 400 is in a production phase. In other examples, the BMC 410 can search for new monitored controllers 430, for example, periodically, based on input received from another portion of the device 400 (e.g., input that a card was inserted into a bus, etc.), or the like. Thus, when a monitored controller is added to the device 400, the monitored controller can be on boarded by the BMC 410.

For each monitored controller 430, BMC 410 can execute communication instructions 426 to identify the monitored controller. The BMC 410 can execute key instructions 424 to select and provide a key to the monitored controller that can be used to sign information that the BMC 410 can verify. The BMC 410 can track each key sent using a unique identifier to identify the monitored controller 430 (e.g., by using a data structure such as a table or list). The monitored controller 430 can then provide one or more parameters to be monitored to the BMC 410. The providing can be based on communications between the BMC 410 and monitored controller 430, for example, by the BMC 410 asking for particular parameters based on an identifier that identifies a type of device the monitored controller is associated with or by the monitored controller 430 providing information about parameter(s) that are pre-determined by the monitored controller. The BMC 410 can store the parameter(s) in a data structure such as the parameter representation described above. In some examples, the BMC 410 can protect the parameter representation using cryptographic information. Moreover, in some examples, the BMC 410 can keep a backup of the parameters to be used in the event of an unauthorized change.

As noted above, the BMC 410 can include a hardware root of trust to verify system integrity of the device 400. In some examples, at a time of provisioning the device 400, the keys can be provided to the respective monitored controllers 430 and the representation of the parameters can be created. Further, additional parameters/monitored controllers 430 can be added as described above.

Method 300 can be implemented by BMC 410 to determine whether an unauthorized modification has occurred. At 302, the monitor instructions 422 can be executed by BMC 410 to monitor parameters associated with the respective monitored controllers 430. As noted above, monitoring can include a request for the current parameter value, where the respective monitored controller 430 provides the current parameter value. In other examples, the monitored controller can be configured to automatically send the current parameter value (e.g., when a timer triggers sending, based on a schedule, etc.). Thus, the communication can be based on a regular communication between the respective monitored controller 430 and the BMC. At 304, communication instructions 426 can be executed to the BMC 410 receives the current version of a parameter from a monitored controller 430. As noted, communication received from the monitored controller 430 can be signed using the key received by the monitored controller 430.

At 306, the monitor instructions 422 can be executed to determine whether an unauthorized modification has occurred to the current version of the parameter using the representation. This can be implemented by comparing the current version of the parameter received to the version in the representation. If there is a deviation, a security action can be performed as further detailed in reference to FIG. 6 and method 600.

Figure 5:
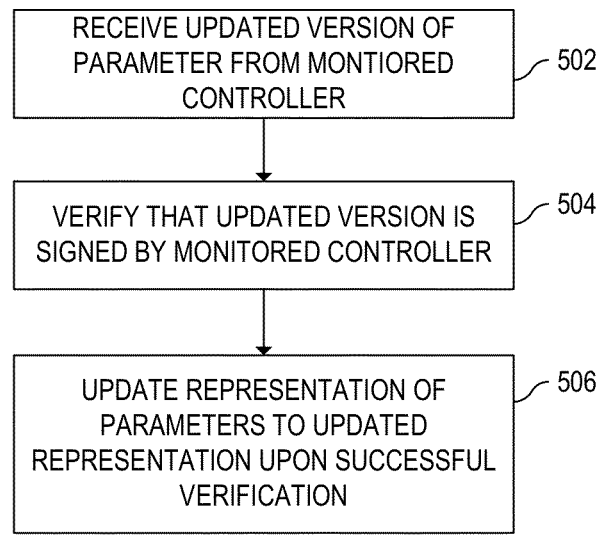
FIG. 5 is a flowchart of a method for updating a representation of parameters used for monitoring parameters of a controller, according to an example.

FIG. 5 is a flowchart of a method for updating a representation of parameters used for monitoring parameters of a controller, according to an example. Although execution of method 500 is described below with reference to device 400, other suitable components for execution of method 500 can be utilized (e.g., computing system 100, 200). Additionally, the components for executing the method 500 may be spread among multiple devices. Method 500 may be implemented in the form of executable instructions stored on a machine-readable storage medium, such as storage medium 420, and/or in the form of electronic circuitry.

Each monitored controller 430 can be configured such that when a parameter is modified using an authorized approach (e.g., via a user interface provided to an OS, BIOS, BMC, etc.), the monitored controller 430 sends an update message to the BMC 410. The update message can be signed using the received key.

The BMC 410 can receive, the updated version of the parameter for the monitored controller (502). As noted, the updated version can be signed by the key associated with the respective monitor.

In response, the BMC 410 can verify the updated version using a private key (504). Verification can include checking that the signed information is correct using the private key.

The BMC 410 can then update the representation to include the updated version of the parameter in response to successful verification (506). In some examples, more than one parameter can be changed at the same time. In some of these examples a single data structure can be used to convey, from the monitored controller to the BMC 410 each of the parameters associated with the particular monitored controller.

Because the key is conveyed by the BMC 410 to the monitored controller 430 when the monitored controller 430 is first detected in the device 400 and initial parameter information and updates to parameters are conveyed via a signed message using the key, changes to any of the monitored parameters can be considered an unauthorized modification. Thus, in some examples, the representation cannot be updated without a signature using the associated key. In some examples, a backup of each parameter can be kept by the BMC 410 in a backup store. Further, in some examples, an audit log can be kept by the monitored controller 430 including authorized modifications. The audit log can include, for example, the parameter(s) modified, the approach used for modification, information about an authorized user, and what the new value for the parameter(s) is.

Figure 6:
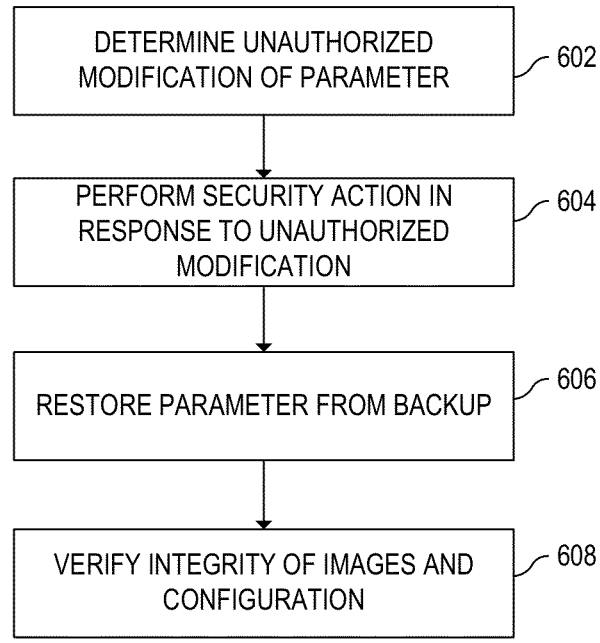
FIG. 6 is a flowchart of a method for performing a security action in response to the determination that a parameter was modified without authorization, according to an example.

FIG. 6 is a flowchart of a method for performing a security action in response to the determination that a parameter was modified without authorization, according to an example. Although execution of method 600 is described below with reference to device 400, other suitable components for execution of method 600 can be utilized (e.g., computing system 100, 200). Additionally, the components for executing the method 600 may be spread among multiple devices. Method 600 may be implemented in the form of executable instructions stored on a machine-readable storage medium, such as storage medium 420, and/or in the form of electronic circuitry.

The BMC 410 can execute monitor instructions 422 to monitor the monitored controllers 430. In one example, the BMC 410 can interrogate each monitored controller 430 for a current version of respective parameter(s). In turn, the respective monitored controller 430 can provide its respective parameter(s) to the BMC 410 in response to a request. As noted, the communication can be signed or encrypted.

The BMC 410 can determine whether the received current version has an unauthorized modification (602). In one example, the BMC 410 can compare the current version of a parameter to the parameter representation to determine whether it has changed compared to the expected value. If there is a deviation, an unauthorized modification has occurred. As noted above, the deviation can represent a potential attack on the device 400. In some examples, the interrogation can be part of a regular communication between the BMC 410 and monitored controller 430. In other examples, the monitored controller 430 can be configured to regularly communicate its current parameters.

At 604, BMC 410 can perform a security action in response to detection of an unauthorized modification by executing security instructions (not shown). In one example, the security action can include sending an alert (e.g., a log message, an email, etc.) to an administrator, a security information and event management system, etc. In another example, the security action can include restoring the parameter to the expected value from the backup store (606).

Further, in some examples, the BMC 410 can verify a platform firmware image, the BMC firmware image, the firmware images of the monitored controllers, etc., for example, using a secure boot process (608). Similarly, security configurations can be verified using a similar approach. These verifications can be performed prior to performing the restore of the backup version of the parameter or after.

This approaches described herein can help detect intrusions and modification of parameters such as security parameters from insider attacks, user errors and advanced malwares in a secure way using a centralized and standardized audit log monitoring service running on a secure management system e.g., a BMC protected by a root of trust.

The system benefits from the ability to interpret and analyze standard audit logs from distributed management controllers (e.g., monitored controllers) inside a system (e.g., a server chassis). In some examples, the automated verification, synchronization and check pointing solution to populate the recovery configuration store can help both detection and recovery of parameters that are monitored.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A method comprising:
    monitoring, by a management controller, a plurality of parameters in a computing system that includes a plurality of monitored controllers, wherein each of the monitored controllers includes at least one of a parameter of the plurality of parameters;
    providing, by the management controller, respective keys to the plurality of monitored controllers, the respective keys comprising a first key provided to a first monitored controller of the plurality of monitored controllers;
    storing, at the management controller, a representation of the plurality of parameters;
    receiving, at the management controller, update information from the first monitored controller signed using the first key provided by the management controller to the first monitored controller, the update information comprising an updated version of a first parameter of the first monitored controller;

in response to the update information, updating, by the management controller, the representation of the plurality of parameters;

receiving, at the management controller from the first monitored controller, a current version of the first parameter; and determining whether an unauthorized modification occurred to the current version of the first parameter using the updated representation of the plurality of parameters.

2. The method of claim 1, wherein the management controller is a baseboard management controller.

3. The method of claim 1, further comprising:

verifying, by the management controller using a private key, the update information signed using the first key, wherein the updating of the representation of the plurality of parameters to include the updated version of the first parameter is in response to a successful verification of the update information by the management controller.

4. The method of claim 3, wherein the management controller declines to update the representation of the plurality of parameters if the update information is not signed with the first key.

5. The method of claim 1, comprising:

determining whether the unauthorized modification occurred to the current version of the first parameter by comparing the current version of the first parameter to the updated representation of the plurality of parameters; and performing a security action in response determining that the unauthorized modification occurred.

6. The method of claim 5, further comprising:

restoring, as part of the security action, the first parameter to a backup version of the first parameter.

7. The method of claim 6, further comprising:

verifying a firmware image and/or a security configuration each corresponding to the first monitored controller prior to performing the restoring as part of the security action.

8. The method of claim 1, wherein the receiving of the current version of the first parameter is in response to a request for the current version of the first parameter by the management controller.

9. The method of claim 1, wherein the receiving of the current version of the first parameter is part of a regular communication provided by the first monitored controller.

10. The method of claim 1, wherein the management controller includes a hardware root of trust to verify system integrity and, at a time of provisioning of the computing system, the management controller creates the representation of the plurality of parameters by communicating with the plurality of monitored controllers.

11. The method of claim 10, further comprising:

determining, by the management controller, that an additional monitored controller was added to the computing system;

providing a respective key to the additional monitored controller;

receiving an additional parameter from the additional monitored controller; and adding the additional parameter to the representation of the plurality of parameters.

12. A non-transitory machine-readable storage medium storing instructions that upon execution by a baseboard management controller of a device, cause the baseboard management controller to:

monitor a plurality of parameters, wherein the device includes a plurality of monitored controllers, and wherein each of the plurality of monitored controllers includes a parameter of the plurality of parameters;

provide, from the baseboard management controller, respective keys in a key repository to the plurality of monitored controllers, the respective keys comprising a first key provided to a first monitored controller of the plurality of monitored controllers;

store, at the baseboard management controller, a representation of the plurality of parameters;

receive, at the baseboard management controller, update information from the first monitored controller signed using the first key provided by the baseboard management controller to the first monitored controller, the update information comprising an updated version of a first parameter of the first monitored controller;

in response to the update information, update, at the baseboard management controller, the representation of the plurality of parameters;

receive, at the baseboard management controller from the first monitored controller, a current version of the first parameter; and determine whether an unauthorized modification occurred to the current version of the first parameter using the updated representation of the plurality of parameters.

13. The non-transitory machine-readable storage medium of claim 12, wherein the instructions upon execution cause the baseboard management controller to:

verify the update information signed with the first key; and update the representation of the plurality of parameters to include the updated version of the first parameter in response to a successful verification of the update information.

14. The non-transitory machine-readable storage medium of claim 12, wherein the plurality of parameters comprise a parameter of a security register of a Basic Input/Output System (BIOS).

15. The non-transitory machine-readable storage medium of claim 12, wherein the instructions upon execution cause the baseboard management controller to:

determine whether the unauthorized modification occurred to the current version of the first parameter by comparing the current version of the first parameter to the updated representation of the plurality of parameters;

perform a security action in response to determining that the unauthorized modification occurred; and restore, as part of the security action, the first parameter to a backup version of the first parameter.

16. The non-transitory machine-readable storage medium of claim 12, wherein the instructions upon execution cause the baseboard management controller to:

at a time of provisioning of the device, determine the representation of the plurality of parameters by communicating with the plurality of monitored controllers.

17. The non-transitory machine-readable storage medium of claim 16, wherein the instructions upon execution cause the baseboard management controller to:

determining that an additional monitored controller was added to the device;

provide a respective key to the additional monitored controller;

receive an additional parameter from the additional monitored controller; and add the additional parameter to the representation of the plurality of parameters.

18. A computing system comprising:
a central processing unit (CPU);
a memory;
a baseboard management controller separate from the CPU, wherein the baseboard management controller includes a key repository;
a plurality of monitored controllers, wherein each of the plurality of monitored controllers includes a parameter of a plurality of parameters,
wherein the baseboard management controller is to:
provide respective keys from the key repository to the plurality of monitored controllers, the respective keys comprising a first key provided to a first monitored controller of the plurality of monitored controllers,
store a representation of the plurality of parameters,
receive update information from the first monitored controller signed using the first key provided by the baseboard management controller to the first monitored controller, the update information comprising an updated version of a first parameter of the first monitored controller,
in response to the update information, update the representation of the plurality of parameters,
receive a current version of the first parameter from the first monitored controller,
determine that an unauthorized modification occurred to the current version of the first parameter using the updated representation of the plurality of parameters, and
perform a security action in response to the determination that the unauthorized modification occurred.

19. The computing system of claim 18,
wherein the baseboard management controller is to:
verify the update information signed with the first key, and
update the representation of the plurality of parameters to include the updated version of the first parameter in response to a successful verification of the update information.

20. The computing system of claim 19, wherein the verifying of the update information signed with the first key is based on a private key of the baseboard management controller.

* * * * *